Jan. 12, 1971          M. GUIOT                    3,555,542
           METHODS AND APPARATUS FOR DETERMINING
                THE ANGULAR POSITION OF A SHAFT
Filed March 27, 1967                         2 Sheets-Sheet 1
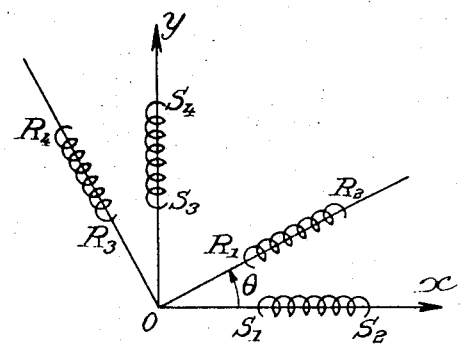
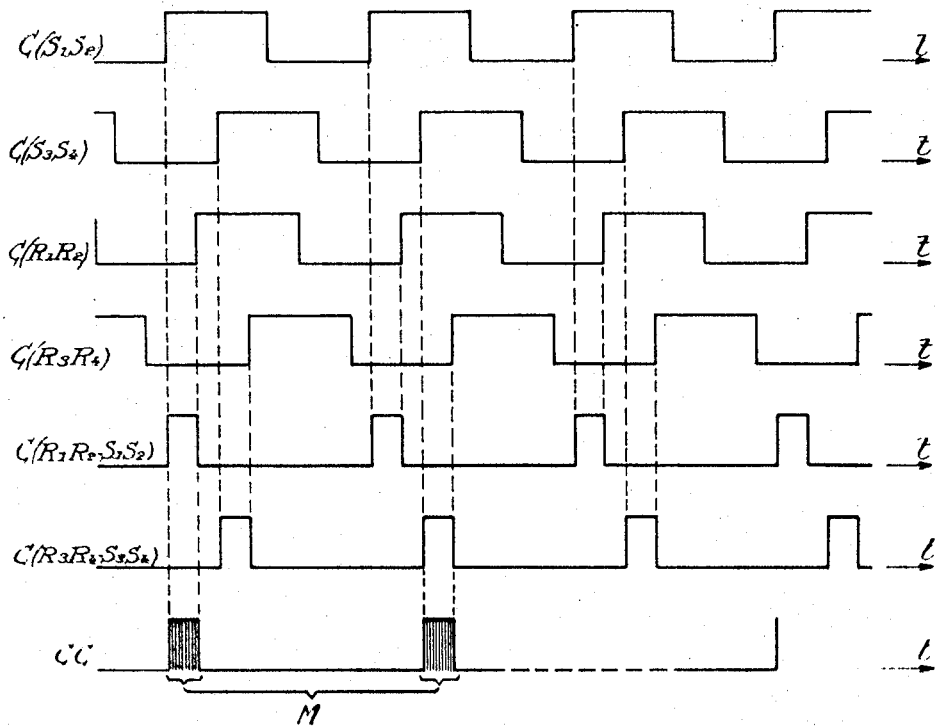

United States Patent Office 3,555,542
Patented Jan. 12, 1971

3,555,542
METHODS AND APPARATUS FOR DETERMINING THE ANGULAR POSITION OF A SHAFT
Maurice Guiot, Domont, France, assignor to Societe d'Applications Generales d'Electricite et de Mecanique SAGEM, Paris, France
Filed Mar. 27, 1967, Ser. No. 626,187
Claims priority, application France, Apr. 6, 1966, 56,704
Int. Cl. G08c 9/04; H03k 13/20
U.S. Cl. 340—347      12 Claims

ABSTRACT OF THE DISCLOSURE

In order to determine the angular position of a shaft, use is made of a resolver having a stator and a rotor, the latter being connected with said shaft. The two-phase stator comprises two windings $S_1S_2$ and $S_3S_4$ forming each $n$ pairs of poles to which are respectively applied two sinusoidal voltages of the same frequency and the same amplitude but at 90° to each other, obtained by frequency division from an oscillator of frequency F. The two-phase rotor comprises two windings $R_1R_2$ and $R_3R_4$ each forming $n$ pairs of poles and measurement is made, by counting pulses of frequency F, of the algebraic sum of the phase differences between the voltages across the terminals of $S_1S_2$ and $R_1R_2$ on the one hand and $S_3S_4$ and $R_3R_4$ on the other hand, this sum being taken as the measurement of $n$ times the double of the angle defining the position of the shaft.

---

Figure 2:
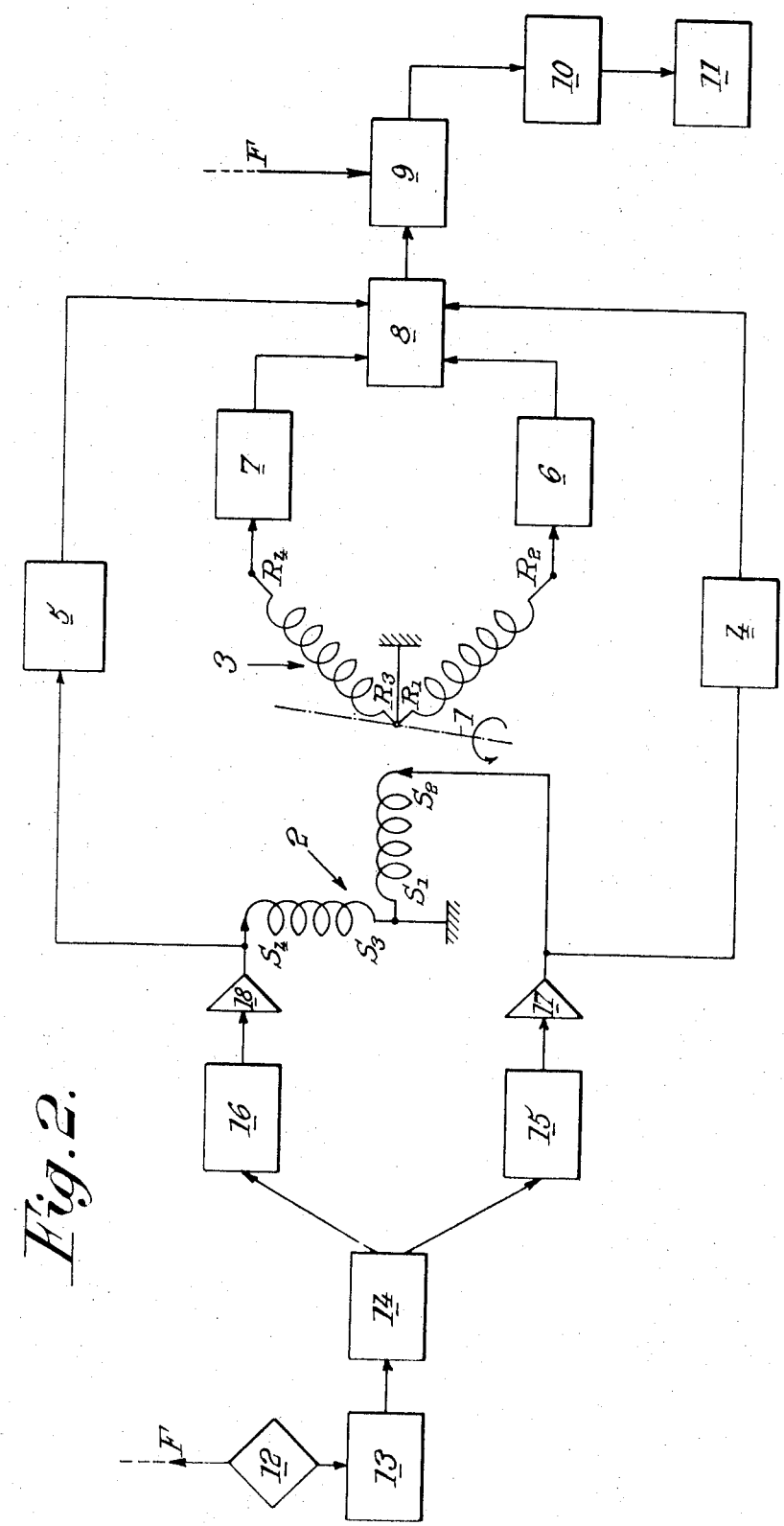

The present invention relates to the determination of the angular position of a shaft.

It is known to make use, for this purpose, of a rotary transformer wherein the electromagnetic coupling between the primary and secondary windings thereof is variable, such a transformer being called a "resolver."

The resolvers with which the present invention is concerned include a two-phase stator and rotor, either multipolar or bipolar. Each of the two windings of the stator and of the rotor forms $n$ pairs of pole-pieces, $n$ being an integer greater than, or equal to, 1. On the periphery of the stator and on that of the rotor, the pole-pieces of the first winding follow each other in a north-south alternate manner and at regular intervals, the pole-pieces of the second winding being inserted between the pole-pieces of the first winding respectively and at equal distances therefrom. The primary of the transformer which constitutes the resolver may be either the stator or the rotor and of course the secondary is either the rotor or the stator, respectively.

The rotor is rigidly secured to the shaft the angular position of which is to be determined.

When two sinusoidal voltages of the same frequency, of the same amplitude and in quadrature with each other are applied across the terminals of the two primary windings, respectively, there is obtained, across the terminals of each of the secondary windings, a sinusoidal induced voltage phase shifted, with respect to the primary voltages, of an angle equal to $n$ times the angle which determines the position of the rotor (with the difference of an additive constant).

When measuring, also in a known manner, the phase difference between the voltage across the terminals of the first primary winding and the voltage across the terminals of the first secondary winding, which phase difference will be hereinafter called "main phase shift," it is possible to determine the angular position of the rotor in ranges of $360°/n$ and in particular in a range of $360°$ in the case of a bipolar stator and rotor.

This measurement makes possible to measure the main phase shift between the voltage across the terminals of the first primary winding and the voltage across the terminals of the first secondary winding, the second secondary winding being not used for the measurement.

Determination of the angular position of the rotor obtained by such a measurement involved, up to now, an error due, on the one hand, to defects in the feed of current to the primary windings and, on the other hand, to mechanical and electrical defects inherent in the resolver.

The chief object of the present invention is to reduce or even to eliminate such errors.

The method according to the present invention comprises, on the one hand, applying on the terminals of the two primary windings, which may be the stator or the rotor windings, respectively two sinusoidal voltages of the same frequency and of the same amplitude but at 90° to each, and, on the other hand, measuring the phase difference, called "main phase difference," between the voltage across the terminals of the first primary winding and the voltage across the terminals of the first secondary winding, this method being characterized by the fact of algebraically adding to said first phase difference a corrective phase difference called "complementary phase difference," collected between the voltage across the terminals of the second secondary winding and the voltage across the terminal of one of the other windings of the rotary transformer.

According to an advantageous feature of the present invention the complementary phase shift is derived between the voltage across the terminals of the second secondary winding and the voltage across the terminals of the second primary winding, the algebraic sum of the main phase shift and of the complementary phase shift being equal (with the difference of an additive constant) to $n$ times the double of the angle defining the position of the rotor.

According to an advantageous feature of the present invention, the complementary phase difference between the voltage across the terminals of the second secondary winding and the voltage across the terminals of the first primary winding, the algebraic sum of the main phase difference and of the complementary phase difference being equal (with the difference of an additive constant) to $n$ times the double of the angle defining the position of the rotor.

According to another advantageous feature of the present invention, one half of the complementary phase shift is collected between the voltage across the terminals of the second secondary winding and the voltage across the terminals of the first secondary winding, the algebraic sum of the main phase shift and of one half of the complementary phase shift being equal (with the difference of an additive constant) to $n$ times the angle determining the position of the rotor.

According to an advantageous embodiment of the invention, the device for carrying out the method according to the present invention includes:

shaping circuits receiving the voltages collected across the terminals of the windings of the resolver,
electronic gates receiving the square shaped waves delivered by said shaping circuits, these electronic gates being open by the upward fronts (or downward fronts) of the first square shaped voltage and closed by the upward fronts (or downward fronts) of the second square shaped voltage,
a mixer receiving the phase shifted square waves delivered by said electronic gates and mixing said phase shift square waves with pulses of F frequency, and
a counting register receiving the F frequency pulses delivered by said mixer.

According to another advantageous embodiment, the device for carrying out the method according to the invention comprises:

a high frequency oscillator of frequency F,
a frequency divider receiving this frequency F and delivering a frequency 2f,
a square wave phase shifter receiving the frequency 2f and delivering two square shaped waves of frequency f, and
two filters each receiving a square shaped wave of frequency f, and each delivering a voltage of frequency f, these two voltages being at 90° to each other and being adapted to be applied, respectively, to the two primary windings of the resolver.

A preferred embodiment of the present invention will be hereinafter described with reference to the appended drawings, given merely by way of example, and in which:

FIG. 1 is a diagram illustrating the case of a bipolar two-phase resolver;

FIG. 2 diagrammatically shows a measurement device according to the present invention, measurement being coded in digital form; and FIG. 3 shows, as a function of time, square shaped voltage diagrams produced with the coding system of this device.

It is desired to determine, with respect to a reference system fixed with respect to the support of a shaft 1, the angular position of said shaft. For this purpose, use is made, in a known manner, of a resolver including a two-phase stator and a two-phase rotor either multipolar or bipolar, which resolver may be made in any suitable manner.

In the example hereinafter described with reference to FIG. 2, the apparatus includes a stator 2 intended to act as a reference system for the angular measurement to be made and a rotor 3 driven by shaft 1.

Stator 2 and rotor 3 include each two windings, each winding forming $n$ pairs of pole pieces ($n$ being an integer higher than, or equal to, 1). Along the periphery of the stator and along that of the rotor the pole pieces of the first winding follow one another in an alternate north and south manner and at regular intervals, the pole pieces of the second winding being interposed between the pole pieces of the first winding and at equal intervals between them.

In a two-phase resolver of the usual type, having a bipolar stator and a bipolar rotor (so that $n$ is equal to 1), the windings of the stator and those of the rotor each are formed by two pairs of coils, the axis of a pair of coils of one winding being at right angle to the axis of the other pair of those windings.

The resolver thus constitutes a transformer the primary of which may be either the stator or the rotor. In what follows, by way of example, stator 2 is the primary and rotor 3 is the secondary.

With apparatus of this kind as shown up to this time, determination of the angular position of shaft 1 was performed by applying to the two windings $S_1S_2$ and $S_3S_4$ of the stator respectively two sinusoidal voltages of the same frequency and of the same amplitude, but in guadrature with each other, and by measuring the main phase shift between the sinusoidal voltage across the terminals of one of the stator windings and that across the terminals of one of the rotor windings $R_1R_2$. This main phase shift was considered as equal, with the difference of an additive constant (or, what is the same thing, with a suitable choice of the zero angle), to $n$ times the angle determining the positioning of rotor 3. Preferably, measurement of said main phase shift was made with a digital form coding of the time between the passages through zero of the sinusoidal voltages across the terminals of $S_1S_2$ and $R_1R_2$. The other winding $R_3R_4$ of the rotor was not used for this measurement.

This way of proceeding supplied an indication concerning the position of rotor 3, but this indication involved a systematic error due, on the one hand, to the defects in the current feed to the stator windings (voltages not exactly of the same amplitude and at 90° to one another) and, on the other hand, to defects in the resolver (in the geometry of the stator and rotor windings, eccentricity of the rotor and so on).

In order to supply an idea of this systematic error, it will be evaluated in the case of a bipolar two-phase resolver ($n$ being equal to 1) with reference to FIG. 1. The stator includes two windings $S_1S_2$ and $S_3S_4$ each forming respectively a north pole and a south pole, the two respective pole lines north-south being at right angles to each other, along the axes of a system $Ox$, $Oy$. The rotor includes two windings $R_1R_2$ and $R_3R_4$ each forming two poles, the two respective pole lines north-south being at right angles to each other. Axis $R_1R_2$ makes with axis $S_1S_2$ (extending along $Ox$) an angle $\theta$ which defines the position of the rotor with respect to the stator. The following sinusoidal voltages are then applied on the windings $S_1S_2$ and $S_3S_4$ of the stator $$V(S_1S_2) = a \cos \omega t$$

and $$V(S_3S_4) = b \sin (\omega t + \varphi)$$

of amplitude $a$ and $b$, of frequency $\omega/2\pi$. The time is represented by $t$. The defects in this feed result from the fact that $a$ and $b$ are slightly different and that there is a phase difference equal to an angle $(\pi/2 + \varphi)$ radians between voltage $V(S_3S_4)$ and voltage $V(S_1S_2)$, $\varphi$ being an angle small in comparison with a radian. Account being taken of the defects of the resolver, everything takes place for the rotor as if the voltages applied on windings $S_1S_2$ and $S_3S_4$ were:

$$U(S_1S_2) = a \cos \omega t$$

and $$U(S_3S_4) = a(1-\epsilon) \sin (\omega t + \varphi)$$

$\epsilon$ being a number the absolute value of which is low with respect to 1.

The rotor is subjected to the effect of a rotary magnetic field. This field is in the direction of angle $\theta$ when $$U(S_3S_4)/U(S_1S_2) = tg\ \theta$$

that is to say, $\epsilon$ and $\varphi$ being considered as infinitely small values of the first order, when $$\omega t = \theta - \varphi/2 + (\epsilon \sin 2\theta - \varphi \cos 2\theta)/2$$

(with a difference of an integral multiple of $2\pi$).

The voltage induced in the winding $R_1R_2$ of the rotor passes through zero (for instance from negative values to positive values) when the rotary magnetic field is in the direction of $$\left(\theta - \frac{\pi}{2}\right)$$

that is to say when $$\omega t(R_1R_2)_0 = \theta - \pi/2 - \varphi/2 + (\varphi \cos 2\theta - \epsilon \sin 2\theta)/2$$

$V(S_1S_2)$ passes through zero (from negative values to positive values) when $\omega t$ is given by the following equation $$\omega t(S_1S_2)_0 = -\pi/2$$

and the phase difference $D(R_1R_2 - S_1S_2)$ of the voltage across the terminals $R_1R_2$ with respect to the voltage across the terminals of $S_1S_2$ is given by the following relation $$D(R_1R_2 - S_1S_2) = \omega t(R_1R_2)_0 - \omega t(S_1S_2)_0$$

that is to say $$D(R_1R_2 - S_1S_2) = \theta - \varphi/2 + (\varphi \cos 2\theta - \epsilon \sin 2\theta)/2$$

The systematic error made when taking for zero measurement the phase difference $D(R_1R_2 - S_1S_2)$ is therefore $$-\varphi/2 + (\varphi \cos 2\theta - \epsilon \sin 2\theta)/2$$

Term $-\varphi/2$ is disturbing when $\varphi$ is not the same for different measurements. In this case, this term cannot be eliminated by a suitable choice of the angular zero for $\theta$. The error represented by the term $(\varphi \cos 2\theta - \epsilon \sin 2\theta)/2$, is always present because it depends upon angle $\theta$.

It will be understood that it is of great interest to complete the measurement methods and devices known up to this time in such manner that the error just above mentioned is reduced or even practically eliminated, which would then permit of effecting a more accurate angular measurement.

The object of the present invention is in fact to reduce and possibly to eliminate this error by the introduction of at least one corrective term which, when algebraically added to the main phase difference existing between the voltage across the terminals of winding $S_1S_2$ and the voltage across the terminals of winding $R_1R_2$, permits of obtaining a result approximating more closely the desired exact measurement than when only said main phase difference is taken into account.

According to a principal feature of the invention, advantage is taken of the fact that complementary phase differences exist between the voltages across certain of the windings of a resolver having multipolar or bipolar two-phase stator and rotor windings (such as described above and illustrated in FIG. 2), which complementary phase differences, because of the magnitude and sign thereof, may be used to correct or compensate for errors in the measurement of the main phase difference. Thus, means are provided for algebraically adding a complementary phase difference having a corrective character to the main phase difference between the voltage across the terminals of windings $S_1S_2$ and the voltage across the terminals of winding $R_1R_2$.

According to a preferred embodiment of the invention, the corrective phase difference is the complementary phase difference between the voltage across the terminals of $S_3S_4$ and the voltage across the terminals of $R_3R_4$.

The following calculation, relative to a bipolar two-phase resolver (FIG. 1), shows that said complementary phase difference truly has the desired corrective character.

Axis $R_3R_4$ (line of poles) being not perfectly perpendicular to axis $R_1R_2$, the angle between these two axes is $(\pi/2+\alpha)$ radians, $\alpha$ being a fixed angle the absolute value of which is small in comparison to one radian (and therefore is considered as an infinitely small magnitude of the first order). The voltage induced in the winding $R_3R_4$ of rotor passes through zero (from negative to positive values) when the rotary magnetic field is in the direction corresponding to $(\theta-\alpha)$, that is to say when $\omega t$ corresponds to the following equation $$\omega t(R_3R_4)_0 = \theta + \alpha - \varphi/2 + (\epsilon \sin 2\theta - \varphi \cos 2\theta)/2$$

V $(S_3S_4)$ passes through zero (from negative to positive values) when the value of $\omega t$ is such that $$\omega t(S_3S_4)_0 = -\varphi$$

and the complementary phase difference of the voltage across the terminals of $R_3R_4$ with respect to the terminals of $S_3S_4$ is such that $$D(R_3R_4 - S_3S_4) = \omega t(R_3R_4)_0 - \omega t(S_3S_4)_0$$

that is to say $$D(R_3R_4 - S_3S_4) = \theta + \alpha + \psi/2 + (\epsilon \sin 2\theta - \psi \cos 2\theta)/2$$

which includes the whole of the preceding systymatic error, $$-\varphi/2 + (\varphi \cos 2\theta - \epsilon \sin 2\theta/2$$

changed of sign.

When this complementary phase difference is added to the main phase difference $D(R_1R_2 - S_1S_2)$, the resulting phase difference $E_1$ is obtained $$E_1 = D(R_1R_2 - S_1S_2) + D(R_3R_4 - S_3S_4)$$

that is to say $E_1 = 2\theta + \alpha$.

The resultant difference E is equal, with the possible difference of an additive constant $(\alpha)$ corresponding to a change of origin of angle $\theta$, to twice angle $\theta$.

In the general case of a resolver having multipolar two-phase stator and rotor windings, the resultant phase difference $E_1$ is taken as the measurement, with the difference of an additive constant, of $n$ times the double of the angle defining the position of rotor 3 with respect to stator 2.

The device used according to this preferred embodiment of the invention is diagrammatically shown by FIG. 2. In order to take advantage of the absence of error obtained with the present invention, the phase differences are measured with a high precision.

In particular use is made of a binary system.

The voltages across the terminals of windings $S_1S_2$, $S_3S_4$, $R_1R_2$ and $R_3R_4$ are transformed into square waves in squaring devices, respectively 4, 5, 6 and 7 which change state when said voltages pass through zero. The gates of a system of gates 8 are opened and closed by the upward (downward) wavefronts of the square waveforms corresponding to the voltages between which the phase difference is to be known. Thus, phase difference square waves are obtained. If the voltages fed to windings $S_1S_2$ and $S_3S_4$ have a frequency $f$, a phase difference of 360° corresponds to phase difference square waveforms of a width equal to $1/f$. Pulses of frequency F are delivered in a mixer 9 while said gates 8 are open. Thus a number $m$ of pulses corresponds to a phase difference representing $(m \div f/F)$. 360 mechanical degrees. The total number of pulses, corresponding to the sum of the phase differences to be measured, then passes through a counting register 10 and through a memory resistor 11 where it is stored in memory waiting, for instance, to be visualized or read by an associated calculator.

The pulses of frequency F are generated from a high frequency oscillator 12 (frequency F) of high stability (for instance of the type of a quartz synchronized multivibrator). The sinusoidal voltages of frequency $f$ intended to be applied on the windings $S_1S_2$ and $S_3S_4$ of the stator are obtained from the source of frequency F. A dividing network 13 divides frequency F by powers of 2 (or possibly by powers of 10 etc.) and supplies square waveforms of a frequency $2f$. A square wave phase shifter 14, including bistable trigger circuits, permits obtaining two square waveforms phase offset with respect to each other of one fourth of a period and of frequency $f$. For instance: $F=8192$ kHz., $f=1$ kHz. and $F/f=2^{13}$. Filters 15 and 16 transform these square shaped waveforms into sinusoids of a frequency equal to $f$. The two sinusoids are then amplified at 17 and 18 and energize the windings $S_1S_2$ and $S_3S_4$ of the stator 2 of the resolver. The sinusoidal voltage across the terminals of $S_1S_2$ has the same amplitude as that across the terminals $S_3S_4$ and its phase is in advance of $\pi/2$ with respect to the latter. Of course, any other means for obtaining two sinusoidal voltages at $\pi/2$ to each other could be used, for instance from a sinusoidal voltage of frequency $f$ phase shifted by $\pi/2$ in a shifting device including a transformer and a resistor-capacitor network.

The square waveform voltages C $(S_1S_2)$, C $(S_3S_4)$, C $(R_1R_2)$ and C $(R_3R_4)$ delivered respectively by squaring devices 4, 5, 6 and 7 are shown in FIG. 3 as a function of time $t$, for a given position of rotor 3.

According to said preferred embodiment of the invention, the algebraic sum $E_1$ of the main phase difference between the voltage across the terminals of $S_1S_2$ and the voltage across the terminals of $R_1R_2$ and of the complementary phase difference between the voltage across the terminals of $S_3S_4$ and the voltage across the terminals of $R_3R_4$ is measured.

Gate system 8 advantageously comprises two gates each preferably constituted by bistable trigger circuits. One of them can be opened only by the upward wave fronts of square shaped waveforms C $(S_1S_2)$ and can be closed only by the upward wave fronts of square shaped wave fronts C ($R_1R_2$). Thus phase digerence square shaped waves $C(R_1R_2-S_1S_2)$ disclosed as a function of time $t$ in FIG. 3 are obtained. Their positive portions have a length corresponding to the main phase difference between the voltage across the terminals of $S_1S_2$ and the voltage across the terminals of $R_1R_2$. The other gate can be opened only by the upward wave fronts of square shaped waveforms C ($S_3S_4$) and can be closed only by the upward wave fronts of square shaped waveforms C ($R_3R_4$). Thus are obtained phase difference square waves $C(R_3R_4-S_3S_4)$ as a function of time $t$ in FIG. 3. The positive portions of these square shaped waves have a width corresponding to the complementary difference between the voltage across the terminals of $S_3S_4$ and the voltage across the terminals of $R_3R_4$. The positive portions of square shaped waves $C(R_1R_2-S_1S_2)$ and $C(R_3R_4-S_3S_4)$ are practically of the same width. The corresponding phase differences are practically equal and each increases from zero to 360° when the angle defining the position of rotor 3 relative to the stator 2 increases. Pulses of frequency F coming from oscillator 12 are delivered by mixer 9 while gates 8 are open, the positive portions of said phase difference square shaped waves being shown at CC, as a function of time $t$ in FIG. 3. Account is taken of the time of transfer, from counting register 10 to the storage resistor, of the number of pulses that are delivered by the mixer 9 while gates 8 are open, and also of the resetting of the counters to the initial value, and the duration of a counting cycle ranges from 3 to 4 periods of the feed voltages of the stator windings (frequency $f$).

If M is the total number of pulses that are counted, the angular position of the rotor is equal to:

$$(Mf/F). \ 180°/n$$

where $n$ is the number of pairs of poles.

With a two-phase multipolar resolver, every winding of which included 25 pairs of poles and where $$F/f=2^{13}=8192$$

the angular position of the rotor may be measured with an approximation of less than 10 seconds of arc with a resolution of 3.6 seconds, inside the range of 360°/25 equal to 14.4°. A supplementary measurement, for instance by means of an auxiliary resolver, may possibly determine which of said angle sectors corresponds to said angular position.

Attention is called upon the importance of the choice of the positive sign of the voltages across the terminals of the windings of the resolver, as above mentioned. This necessitates determined connections of the resolver windings in the measurement device.

In all branching cases, correction is ensured. There exists an ambiguity of 180° in the value of the angle that is obtained, the counting system being provided with a circuit (not shown) clearing ambiguity so as to indicate whether it is necessary or not to add 360° to the value obtained in counting register 10 to read the correct value of the angle defining the position of the rotor. Clearing this ambiguity is simpler in the arrangement $S_1S_2-R_1R_2$ and $S_3S_4-R_3R_4$ because ambiguity appears for 360° C.

In a modification of the invention, the corrective phase difference (which must be algebraically added to the phase difference between the voltage across the terminals of $S_1S_2$ and the voltage across the terminals of $R_1R_2$) is the complementary phase difference between the same voltage across the terminals of $S_1S_2$ and the voltage across the terminals of $R_3R_4$.

The following calculation, relative to a bipolar two-phase resolver, shows that said complementary phase difference has a corrective character. Using the same symbols as in the preceding calculation, the complementary phase difference of the voltage across the terminals of $R_3R_4$ with respect to the voltage across the terminals of $S_1S_2$ is given as follows:

$$D(R_3R_4-S_1S_2)=\omega t(R_3R_4)_0-\omega t(S_1S_2)_0$$

that is to say $$D(R_3R_4-S_1S_2)=\theta+\pi/2+\alpha-\varphi/2+(\epsilon \sin 2\theta-\varphi \cos 2\theta)/2$$

where the portion $(\varphi \cos 2\theta - \epsilon \sin 2\theta)/2$ of the systematic error is the same as above but with the opposed sign.

By adding this complementary phase difference to the main phase difference $D(R_1R_2-S_1S_2)$ the resultant phase difference $E_2$ is obtained:

$$E_2=D(R_1R_2-S_1S_2)+D(R_3R_4-S_1S_2)$$

that is to say $$E_2=2\theta+\pi/2+\alpha-\varphi$$

As far as to the error $\varphi$ between the feed voltages of the stator is constant, it may be considered that the resultant phase difference $E_2$ is equal, with the difference of an additive constant $(\pi/2+\alpha-\varphi)$ corresponding to a change of origin of angle $\theta$.

In the general case of a resolver having multipolar two-phase stator and rotor windings, the resultant phase difference $E_2$ is taken as the measurement, with the difference of an additive constant, of $n$ times the double of the angle defining the position of rotor 3 with respect to stator 2.

The device used in this modification of the invention is practically the same as that above described with reference to FIG. 2. Squaring device 5 is unnecessary in this case, because the phase differences to be measured do not require a knowledge of the phase of the voltage across the terminals of $S_3S_4$.

In a last modification according to this invention, the corrective phase difference is one half of the complementary phase difference between the voltage across the terminals of $R_1R_2$ and the voltage across the terminals of $R_3R_4$.

The following calculation shows the corrective character of such a phase difference in the case of a bipolar two-phase resolver.

The half of the complementary phase difference between the voltage across the terminals of $R_3R_4$ and voltage across the terminals of $R_1R_2$ is as follows:

$$D(R_3R_4-R_1R_2)/2=(\omega t(R_3R_4)_0-\omega t(R_1R_2)_0)/2$$

that is to say $$D(R_3R_4-R_1R_2)/2=\pi/4+\alpha/2+(\epsilon \sin 2\theta-\varphi \cos 2\theta)/2$$

By adding this value to the main phase difference $D(R_1R_2-S_1S_2)$, the resultant phase difference $E_3$ is obtained $$E_3=D(R_1R_2-S_1S_2)+D(R_3R_4-R_1R_2)/2$$

that is to say $$E_3=\theta+\pi/4+\alpha/2-\varphi/2$$

As far as error $\varphi$ is constant, it can be considered that the resultant phase difference $E_3$ is equal, with the difference of an additive constant $(\pi/4+\alpha/2-\varphi/2)$ corresponding to a variation of the origin of angle $\theta$, to twice this angle $\theta$.

It should be noted that the resultant phase difference $E_3$ is equal to one half of the preceding resultant phase difference $E_2$.

In the general case of a resolver having multipolar two-phase stator and rotor windings, the resultant phase difference $E_3$ is taken as the measurement, with the difference of an additive constant, of $n$ times the angle defining the position of rotor 3 with respect to stator 2.

The device used in this modification of the invention is still practically the same as that above described with reference to FIG. 2. In this case also, squaring circuit 5 is unnecessary. The square shaped waveforms corresponding to the main phase difference between the voltage across the terminals of $S_1S_2$ and the voltage across the terminals of $R_1R_2$ are mixed with pulses of frequency F, and the square shaped waveforms corresponding to the main phase difference between the voltage across the terminals of $R_1R_2$ and the voltage across the terminals of $R_3R_4$ are filled with pulses of frequency $F/2$.

Thus, it can be seen from the foregoing that by the term "main phase difference" is meant the difference in phase between the voltage across the first primary winding (which may be either a stator or rotor winding) and the voltage across the first secondary winding whereas by the term "complementary phase difference" is meant the difference in phase between the voltage across the second secondary winding and the voltage across one of the other windings, which latter voltage, as set forth hereinabove, may be the voltage across the second primary winding, the voltage across the first primary winding, or the voltage across the first secondary winding (the resultant phase difference between the voltages across the second secondary winding and the first secondary winding actually being one-half of the resultant phase difference in the other two instances set forth).

Among the advantages according to the present invention, the following may be cited:

The systematic error due to the principle of measurement, which consists in making use of a resolver, is reduced and even possibly eliminated;

When the defects in the feed of the stator windings and the defects in the construction of the resolver are small, the precision of measurement of the angle defining the angular position of a shaft is practically limited only by the precision of measurement of the various phase differences, that is to say by the precision of the counting system;

Measurement of the angle determining the angular position of the shaft remains good despite defects in the feed of the stator windings: by way of example it may be stated that errors reaching several degrees concerning the setting of the feed voltages of the stator at right angles to each other do not have serious consequences for the measurement;

Measurement of the angle determining the angular position of the shaft remains good despite defects in the resolver device; among these defects is: lack of accurate positioning of the winding stators, unequality between the transmission ratios between the stator windings and the rotor windings, different phase difference between the two channels of the resolver;

In the main feature of the invention (resultant phase difference $E_1$) and in the first modification (resultant phase difference $E_2$), the resultant phase difference to be measured is related to the double of the angle determining the angular position of the shaft, which involves, when using a counting system by pulses of fixed frequency, a resolution, in the measurement of said angle, divided by two (that is to say twice better) than that obtained through known methods, where the phase difference to be measured is related to the angle and to twice this angle.

The invention also applies to modifications where the multipolar resolver is of the type known under the registered trade-mark "iductosyn" where the stator and the rotor are each constituted by a disc, said discs rotating opposite each other and each including near its periphery two windings, preferably engraved or printed in toothed form, disposed along a circumference, one of the windings being offset, with respect to the other, by an angle equal to one half of the pitch difference between the toothed windings.

In a general manner, while the above description discloses what are deemed to be practical and efficient embodiments of the present invention, said invention is not limited thereto as there might be changes made in the arrangement, disposition and form of the parts without departing from the principle of the invention as comprehended within the scope of the appended claims.

What I claim is:

1. An apparatus for determining the angular position of a shaft comprising a two-phase rotary transformer including a stator, and a rotor mechanically coupled to said shaft, said rotor and said stator each including a pair of windings forming $n$ pairs of poles, $n$ being an integer at least equal to 1, the two windings of the stator and the two windings of the rotor being disposed such that the poles of the first winding follow one another in an alternate north-south manner and at regular intervals and that the poles of the second winding are interposed in the same alternate manner between the poles of the first winding at equal distances therebetween, one of said pairs of windings constituting the primary windings and the other pair of said windings constituting the secondary windings, means for applying a first sinusoidal voltage across said first primary winding, means for applying a second sinusoidal voltage of the same frequency as and of the same amplitude as, but in phase quadrature with, the first sinusoidal voltage, means for measuring the phase difference, termed the "main phase difference," between the voltage across the first primary winding and the voltage across the first secondary winding, means for deriving a corrective phase difference, termed the "complementary phase difference," between the voltage across the second secondary winding and the voltage across one of the other windings, and means for algebraically adding said complementary phase difference to said main phase difference to compensate for errors therein.

2. An apparatus as claimed in claim 1 further comprising squaring circuit means for receiving the output voltages of the windings of the rotary transformer and for converting said voltages into voltages of square-shaped waveform, electronic gate means for receiving said square-shaped voltage waveforms, said gate means being opened by the wavefronts of a first train of pulses of square-shaped voltage waveform and closed by the wavefronts of a second train of pulses of square-shaped voltage waveform, for producing an output train of pulses of square-shaped voltage waveform and of pulsewidths corresponding to the phase difference between said first and second square-shaped voltage waves, mixer means for receiving said output train of pulses and for mixing said pulses with pulses of a further frequency, F, and counting means for receiving the pulses of frequency F delivered by said mixer means.

3. An apparatus as claimed in claim 1 further comprising a storage register for receiving the sum of pulses of frequency F counted by said counting means.

4. An apparatus as claimed in claim 1 further comprising high frequency oscillator means for producing an output voltage of frequency F, dividing network means for receiving said high frequency voltage and for producing a voltage of frequency $2f$, square-shaped waveform phase shifting means for receiving the voltage of frequency $2f$ and for delivering two square-shaped waveform voltages of frequency $f$, and first and second filters for receiving respective ones of said square-shaped waveforms of frequency $f$, and for individually delivering a sinusoidal voltage of frequency $f$, the two sinusoidal voltages delivered by said first and second filters being in quadrature to one another and being applied, respectively, to the two primary windings of the rotary transformer.

5. An apparatus for determining the position of a movable element comprising a two-phase transformer including a primary and a secondary, said primary being mechanically coupled to said element, said primary and secondary each including first and second windings forming $n$ pairs of poles, $n$ being an integer at least equal to 1, the first and second windings of the secondary and the first and second windings of the primary being disposed such that the poles of the first windings follow one another in an alternate north-south manner and at regular intervals and that the poles of the second winding are interposed in the same alternate manner between the poles of the first winding at equal distances, therebetween, means for applying a first sinusoidal voltage to said first primary winding, means for applying a second sinusoidal voltage to said second primary winding, said second sinusoidal voltage being of the same frequency and the same amplitude as said first sinusoidal voltage but being in quadrature therewith, means for measuring the phase difference, termed the "main phase difference," between the voltage across the first primary winding and the voltage across the first secondary winding, wherein the improvement comprises means for deriving a corrective phase difference, termed the "complementary phase difference," between the voltage across said second secondary winding and the voltage across one of said other windings of said transformer, and means for algebraically adding said complementary phase difference to said main phase difference to compensate for errors therein.

6. A method of determining the angular position of a shaft using a two-phase rotary transformer including a stator, and a rotor coupled to the shaft, the stator and rotor each including two windings forming n pairs of poles, n being an integer equal to at least 1, the two windings of the stator and the two windings of the rotor being disposed such that the poles of the first winding follow one another in an alternate north-south manner and at regular intervals, and that the poles of the second winding are interposed in the same alternate manner between the poles of the first winding at equal distances therebetween, said method comprising the steps of:

(a) applying to said first and second primary windings (which may be the stator or the rotor windings), respectively, first and second sinusoidal voltages of the same frequency and of the same amplitude but in phase quadrature to one another, (b) measuring the difference in phase, termed the "main phase difference" between the voltage across the first primary winding and the voltage across the first secondary winding, (c) deriving the difference in phase, termed the complementary phase difference, between the voltage across the second secondary winding and the voltage across one of the other windings, (d) algebraically adding the complementary phase difference to the main phase difference to compensate for errors in the measurement of the main phase difference.

7. A method as claimed in claim 6 wherein said complementary phase difference is the difference in phase between the voltage across the second secondary winding and the voltage across the second primary winding, the algebraic sum of the main phase difference and the complementary phase difference being taken as the measurement, with the difference of an additive constant, of $n$ times twice the angle defining the position of said rotor.

8. A method as claimed in claim 6 wherein said complementary phase difference comprises the difference in phase between the voltage across the second secondary winding and the voltage across the first primary winding, the algebraic sum of the main phase difference and the complementary phase difference being taken as the measurement, with the difference of an additive constant, of $n$ times twice the angle defining the position of said rotor.

9. A method as claimed in claim 6 wherein said complementary phase difference comprises the difference in phase between the voltage across the second secondary winding and the voltage across the first secondary winding, the algebraic sum of the main phase difference and the complementary phase difference being taken as the measurement, with a difference of an additive constant, of $n$ times the angle defining the position of said rotor.

10. A method as claimed in claim 6 wherein said adding step is performed using a digital coding system, said method further comprising squaring the output voltages of the windings of said transformer to produce square-shaped waveforms, applying these waveforms to gates opened by the wavefronts of a first series of square waves and closed by the wavefronts of a second series of square waves so as to produce square waves of a duration corresponding to the phase difference between the first and second voltages, mixing the phase difference square waveforms corresponding to the main phase difference and complementary phase difference in a mixer with pulses of a frequency F, and applying the output of the mixer to a counting register, a number $m$ of said pulses corresponding to a phase difference of $m(f/F)(360°)$ where $f$ is the frequency of the voltage applied to the transformer windings.

11. A method as claimed in claim 6 further comprising using a high frequency oscilaltor of frequency F to produce a voltage for application to the primary windings of the rotary transformer, dividing this frequency F, in a dividing network to produce a voltage of frequency $2f$, the high frequency voltage generated by said oscillator being operated on to produce a square waveform voltage, applying said square waveform voltage of frequency $2f$ to a square wave phase shifter to produce first and second sinusoidal voltages of frequency $f$ and in phase quadrature with respect to one another, said first and second square waves being filtered to produce said sinusoidal voltages.

12. A method of determining the position of a movable element by means of a two-phase transformer including a primary and a secondary, the primary of said transformer being mechanically coupled with the element, the secondary and the primary of said transformer each including first and second windings forming n pairs of poles, n being an integer at least equal to 1, the two windings of the secondary and the two windings of the primary being disposed such that the poles of the first winding follow one another in alternate north-south manner and at regular intervals and that the poles of the second winding are interposed in the same alternate manner between the poles of the first winding at equal distances therebetween, which method comprises applying a first sinusoidal voltage to said first primary winding, applying a second sinusoidal voltage to said second primary winding, said second sinusoidal voltage being of the same frequency and of the same amplitude as, but in phase quadrature to, said first sinusoidal voltage, and measuring the phase difference, termed the "main phase difference," between the voltage across said first primary winding and the voltage across said first secondary winding, wherein the improvement comprises deriving a corrective phase difference, termed the "complementary phase difference," between the voltage across the terminals of said second secondary winding and the voltage across the terminals of one of the other windings of the transformer and algebraically adding said complementary phase difference to said main phase difference to compensate for errors therein.

References Cited

UNITED STATES PATENTS

| | | | |
|---|---|---|---|
| 2,894,256 | 7/1959 | Kronacher | 340—347 |
| 3,092,718 | 6/1963 | Wullert | 235—154 |
| 3,136,987 | 6/1964 | Bock et al. | 340—347 |
| 3,226,710 | 12/1965 | Tripp | 340—347 |

FOREIGN PATENTS

| | | |
|---|---|---|
| 1,015,608 | 1/1966 | Great Britain. |

MAYNARD R. WILBUR, Primary Examiner

G. R. EDWARDS, Assistant Examiner

U.S. Cl. X.R.

318—18, 340—198